(12) United States Patent
Barker et al.

(10) Patent No.: US 7,985,965 B2
(45) Date of Patent: Jul. 26, 2011

(54) QUANTUM COMPUTING DEVICE AND METHOD INCLUDING QUBIT ARRAYS OF ENTANGLED STATES USING NEGATIVE REFRACTIVE INDEX LENSES

(75) Inventors: Delmar L. Barker, Tucson, AZ (US);
William R. Owens, Tucson, AZ (US);
Ross D. Rosenwald, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 964 days.

(21) Appl. No.: 11/693,405

(22) Filed: Mar. 29, 2007

(65) Prior Publication Data

US 2008/0237579 A1    Oct. 2, 2008

(51) Int. Cl.
*H01L 29/06* (2006.01)
*H01L 31/072* (2006.01)
(52) U.S. Cl. ............... 257/22; 257/30; 977/933
(58) Field of Classification Search ............ 257/22, 257/30, 31, 36, E29.168, E49.003; 977/933
See application file for complete search history.

(56) References Cited

U.S. PATENT DOCUMENTS

| | | | | |
|---|---|---|---|---|
| 6,472,681 | B1 * | 10/2002 | Kane | 257/14 |
| 6,635,898 | B2 * | 10/2003 | Williams et al. | 257/14 |
| 6,787,794 | B2 * | 9/2004 | Cain et al. | 257/20 |
| 2005/0110106 | A1 | 5/2005 | Goto et al. | |
| 2006/0022190 | A1 | 2/2006 | Freedman et al. | |
| 2006/0043357 | A1 | 3/2006 | Ichimura et al. | |
| 2006/0045269 | A1 | 3/2006 | Freedman et al. | |

OTHER PUBLICATIONS

Brennan & Williams, Phys. Rev A 68, 042311, 2003, "Entanglement Dynamics in 1D Quantum Cellular Automata", pp. 1-12, Jun. 5, 2005.
Jurgen Kastel and Michael Fleischhauer, "Quantum Electrodynamics in Media with Negative Refraction", Dec. 2004, pp. 1-11, Apr. 5, 2006.
J.B. Pendry and S.A. Ramakrishna, "Near Field Lenses in Two Dimensions", J. Phys. [Condensed Matter] 14, 1-17, 2002, pp. 1-20, Jul. 26, 2002.
ARDA (Advanced Research and Development Activity), "Neutral Atom Approaches to Quantum Information Processing and Quantum Computing: A Quantum Information Science and Technology Roadmap, Version 2", Apr. 2, 2004, pp . i-15.
Dorner et al., "Entangling Strings of Neutral Atoms in 1D Atomic Pipeline Structures", Physical Review Letters, vol. 91, No. 7, Aug. 15, 2003, pp. 073601/1-4.
Dumke et al., "Quantum Information Processing with Atoms in Microfabricated Optical Elements", 2003 European Quantum Electronics Conference, 2003, p. 391.
Kästel et al., "Suppression of spontaneous emission and superradiance over macroscopic distances in media with negative refraction", Physical Review A, vol. 71, No. 1, Jan. 2005, pp. 11804/1-5.

(Continued)

*Primary Examiner* — Hung Vu
(74) *Attorney, Agent, or Firm* — Renner, Otto, Boisselle & Sklar, LLP

(57) ABSTRACT

A quantum computing device and method employs qubit arrays of entangled states using negative refractive index lenses. A qubit includes a pair of neutral atoms separated by or disposed on opposite sides of a negative refractive index lens. The neutral atoms and negative refractive index lens are selectively energized and/or activated to cause entanglement of states of the atoms. The quantum computing device enjoys a novel architecture that is workable and scalable in terms of size and wavelength.

20 Claims, 6 Drawing Sheets

OTHER PUBLICATIONS

Plenio et al., "Cavity-loss-induced generation of entangled atoms", Physical Review, vol. 59, No. 3, Mar. 1999, pp. 2468-2475.

International Search Report and Written Opinion for International Application No. PCT/US2008/058218 dated Jul. 9, 2008.

* cited by examiner

QUANTUM COMPUTING DEVICE AND METHOD INCLUDING QUBIT ARRAYS OF ENTANGLED STATES USING NEGATIVE REFRACTIVE INDEX LENSES

TECHNICAL FIELD

The present invention relates generally to the field of quantum computing, and more particularly, to a quantum computing device and method including qubit arrays of entangled atomic states using negative refractive index lenses. In addition, a three-dimensional architecture is provided.

DESCRIPTION OF THE RELATED ART

Quantum information processing covers a variety of fields where quantum mechanical effects are used to process information in applications such as computation and communications.

Quantum computation involves manipulation of data in the form of quantum bits or "qubits." In contrast to classical computation, where a bit of information is used to represent only one of two possible logic states, namely a "1" or a "0," in quantum computation, a qubit can represent both logical states simultaneously as a superposition of quantum states. This property gives rise to powerful computational parallelism. Algorithms that exploit this parallelism have been developed, e.g., for efficiently factorizing large composite integers.

Since the concept and advantages of quantum computing were introduced in the 1990's, a large number of concepts for qubits have been proposed and tried with limited success. Proposed concepts have included systems based on moving quasi-particles around lattices, semiconductor-based systems having quantum wells and optical-resonator-based systems. The development of quantum computing brings about a need for physical qubits that are easily entangled, but individually addressable and initializable.

A generally recognized problem is that quantum computation, and indeed any system involving sensitive information processing, requires a quiet electromagnetic environment to operate. If the system interacts with the environment, it may lose coherence and quantum parallelism may be destroyed.

SUMMARY OF THE INVENTION

According to the present invention, a quantum computing device includes qubits that can be controlled and entangled with minimum interaction with external sources. The quantum computing device includes qubits that include at least a pair of neutral atoms and a negative index lens disposed between the pair of neutral atoms. Negative index metamaterials and perfect lenses are used to provide entanglement in neutral atoms.

One aspect of the disclosed technology relates to a qubit for use in a quantum computing system. The qubit includes a pair of atoms and a negative index lens disposed between the pair of atoms.

According to another aspect, the negative index lens is arranged to entangle states of the pair of atoms.

According to another aspect, the qubit includes a second negative index lens disposed adjacent to one of the pair of atoms and a third atom disposed adjacent to the second negative index lens.

According to another aspect, a qubit array includes a plurality of qubits.

According to another aspect, the plurality of qubits is arranged in a two-dimensional architecture.

According to another aspect, the plurality of qubits is arranged in a three-dimensional architecture.

Another aspect of the disclosed technology relates to a quantum computing method that includes disposing pairs of neutral atoms on opposite sides of negative index lenses, selectively exciting the atoms, selectively energizing and de-energizing the negative index lenses, the selectively energizing and de-energizing facilitating entanglement of states of the atoms, and interrogating the atoms to determine the state of at least one of the neutral atoms.

Another aspect of the disclosed technology relates to a quantum computing device that includes a plurality of neutral atoms, each pair of neutral atoms being separated by a negative index lens, wherein each pair of neutral atoms and negative index lens are arranged to define a quantum bit, and control circuitry operatively coupled to one or more excitation sources, wherein the control circuitry and one or more excitation sources cooperate to entangle the quantum bits.

Another aspect of the disclosed technology relates to a quantum computing device that includes an array of elements, where each element of the array includes a first neutral atom, a second neutral atom, and a negative index lens disposed between the first and second neutral atoms. The first and second neutral atoms are arranged to define first and second basis states of a quantum bit, and the elements are arranged so as to cause entanglement of the quantum bits of the elements of the array.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

Features that are described and/or illustrated with respect to one embodiment may be used in the same way or in a similar way in one or more other embodiments and/or in combination with or instead of the features of the other embodiments.

DETAILED DESCRIPTION OF THE INVENTION

Figure 1:
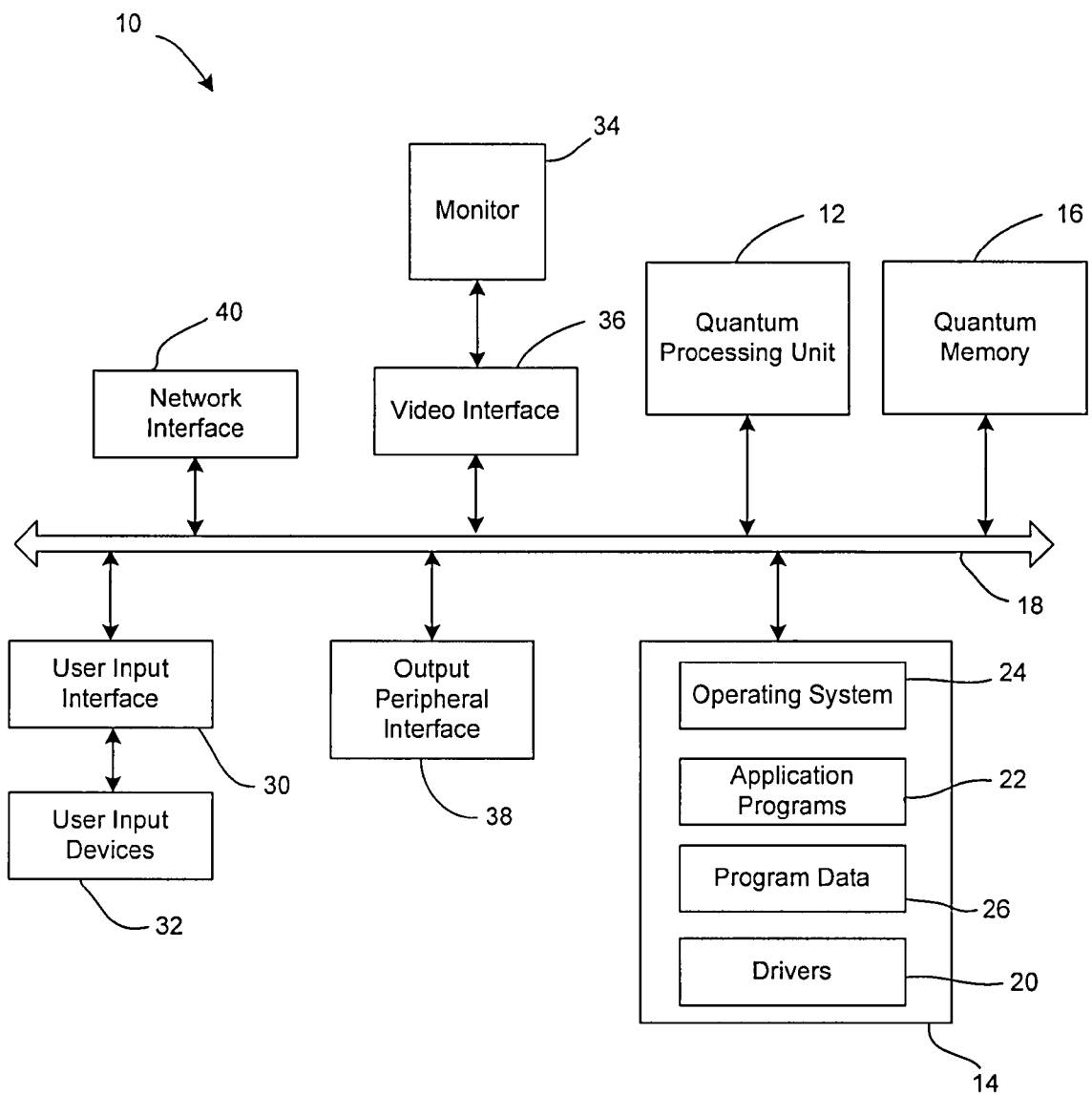
FIG. 1 is a functional block diagram of a quantum computing device in accordance with one embodiment of the disclosed technology.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

One aspect of the disclosed technology includes a quantum computing device having quantum bits ("qubits") that can be controlled and entangled with minimum interaction with external sources. As is described in more detail below, the quantum computing device makes use of a negative index material ("NIM") to construct a negative index lens. The negative index lens is disposed between pairs of neutral atoms to provide entanglement or otherwise controllably couple the neutral atom qubits.

FIG. 1 illustrates an example of a suitable computing system environment 10 (also referred to as a quantum computing system, a quantum computing device or a quantum computer) in which aspects of the disclosed technology may be implemented. The computing system environment 10 is only one example of a suitable computing environment and is not intended to suggest any limitation as to the scope of use or functionality of the disclosed technology. Neither should the computing environment 10 be interpreted as having any dependency or requirement relating to any one or combination of components illustrated in the exemplary operating environment 10.

Aspects of the invention are operational with numerous other general purpose or special purpose computing system environments or configurations. Examples of such computing systems, environments, and/or configurations that may be suitable for use with aspects of the invention include, but are not limited to, personal computers, server computers, hand held or laptop devices, multiprocessor systems, microprocessor-based systems, set top boxes, programmable consumer electronics, network PCs, minicomputers, mainframe computers, distributed computing environments that include any suitable system component or device, and the like.

With reference to FIG. 1, an exemplary system for implementing aspects of the invention includes a general purpose computing device in the form of a computer 10. Components of the computer may include, but are not limited to, a processing unit, e.g., a quantum processing unit 12, a system memory, e.g., a general or conventional system memory 14 and/or a quantum memory 16, and a system bus 18 that couples the various system components, including the system memory (or memories), to the processing unit 12. The system bus 18 may be any of several types of bus structures including a memory bus or memory controller, a peripheral bus and a local bus using any of a variety of bus architectures.

In the illustrated embodiment, conventional memory 14 may be representative of the overall hierarchy of memory devices containing software and data used to implement the functionality of the computer 10. The memory may include, for example, RAM or other volatile solid-state memory, and/or other non-volatile solid-state memory, a magnetic storage medium such as a hard disc drive, a removable storage medium or other suitable storage media. As illustrated, the memory 14 may store drivers 20, e.g., I/O device drivers, application programs 22, an operating system 24 and application program data 26.

In addition, user input interface(s) 30 may couple a variety of user input devices 32, e.g., a mouse, a keyboard, a microphone, a gamepad or the like, to the processing unit 12 via the bus 18. In addition, a display such as a monitor 34 or other suitable display device may be connected to the system bus 18 via an interface, such as a video interface. In addition to the monitor, the computer may also include other peripheral output devices, which may be connected through an output peripheral interface 38.

The computer 10 may operate in a network environment using logical connections to one or more remote computers, e.g., personal computers, servers, routers, network PCs, peer devices or other common network nodes.

Figure 2:
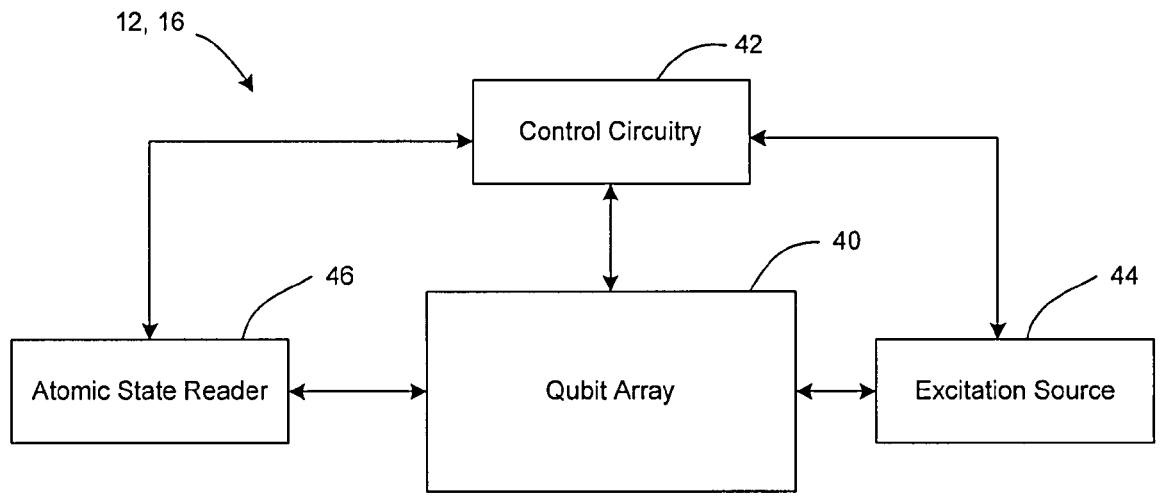
FIG. 2 is a functional block diagram of a quantum processing unit in accordance with one embodiment of the disclosed technology.

Turning now to FIG. 2, aspects of the invention will be discussed with respect to a quantum processing unit 12 and/or quantum memory 16 that includes a qubit or qubit array that is configured to provide sufficient entanglement for use in quantum computing operations. As illustrated, the qubit array 40 may be operatively coupled to suitable control circuitry 42 that cooperates with or otherwise controls, one or more excitation sources 44, e.g., laser sources or sources of electric or magnetic fields, and one or more atomic state readers 46. As is discussed more fully below, the qubit array 40, control circuitry 42, excitation source 44 and atomic state reader 46 cooperate to provide physical qubits that may be entangled as well as individually addressed and set or reset for use in quantum computation processes.

Figure 3:
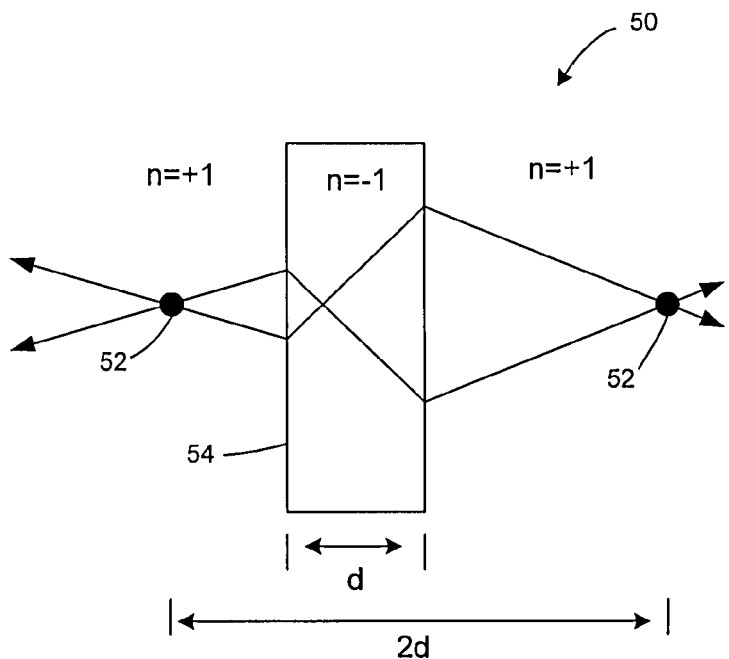
FIG. 3 is a diagrammatic illustration of a qubit in accordance with one exemplary embodiment of the disclosed technology.

Turning now to FIG. 3, a quantum bit ("qubit") 50 is illustrated. In one embodiment, the qubit 50 includes a pair of atoms 52, e.g., neutral atoms, separated by or otherwise disposed on opposite sides of a negative index lens 54. The provision of a negative index lens between a pair of atoms, e.g., neutral atoms, is believed to provide a physical qubit that is easily entangled, while still being individually addressed. As is discussed more fully below, the qubit (or qubit arrays) may take one of a variety of different configurations, geometries, properties or the like, without departing from the scope of the present invention.

In a preferred embodiment, the negative lens is comprised of a negative index material ("NIM"), thereby being constructed as a NIM "perfect lens." One example of a suitable perfect lens, as well as a description of the operative properties, may be found in J. B. Pendry and S. A. Ramakrishna "Near Field Lenses in Two Dimensions," J. Phys. [Condensed Matter] 14 1-17 (2002), which is incorporated herein by reference in its entirety. In the embodiment illustrated in FIG. 3, the negative index lens is depicted as having a thickness d, while the atoms 52 are depicted as being separated by a distance 2d. In this configuration, the optical path length between the atoms is zero. This means that the left atom's (e.g., atom A's) wave function, e.g., spin down|0>A, is combined with the right atom's (e.g., atom B's) wave function, e.g., spin up|1>B, to yield a single product wave function, e.g., |0>A|1>B, that describes the two-atom system occurring at both points (e.g., point A and point B).

Further, the distance between the two focal points of the negative index lens is $d(1-n)$, where n is the refractive index of the negative index lens. It will be appreciated that the thickness d of the negative index lens will depend on a variety of factors, including, the negative index material from which the negative index lens is constructed, e.g., the index of refraction associated with the given negative index material, the types of atoms used in the qubit and the like.

In a preferred embodiment, the negative index lens 52 is constructed from a suitable negative index material, e.g., a metamaterial. It will be appreciated that metamaterials are understood to include materials or objects that gain (electromagnetic) material properties from their structure rather than inheriting then directly from the material of which it is composed. Metamaterials often are associated with material properties not found in naturally-formed substances.

In a preferred embodiment, the qubit 50 will include or otherwise make use of neutral cesium (Cs) atoms. One advantage associated with the use of Cesium atoms stems from the fact that the Cs atom has a pair of states that are separated by a transition energy equivalent to a 9.2 GHz (GigaHertz) photon. Of course, each qubit may include or otherwise make use of other atoms, e.g., other neutral atoms, alkaline atoms, exotic atoms and the like. Nonlimiting examples of suitable atoms include hydrogen, rubidium and positronium.

Figure 4:
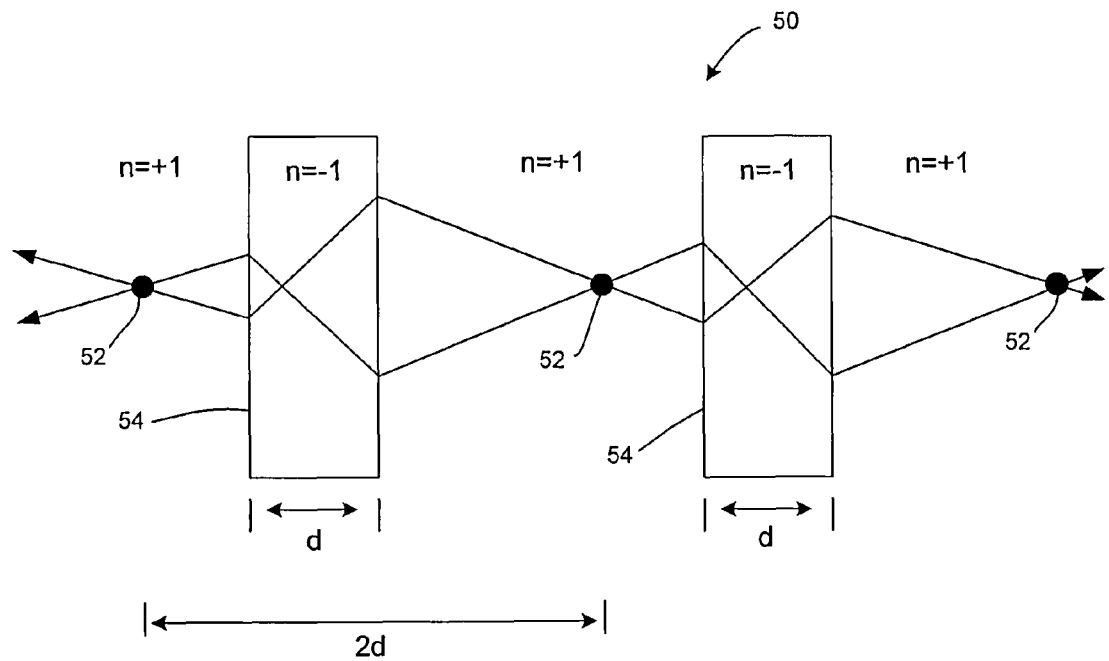
FIG. 4 is a diagrammatic illustration of a qubit in accordance with another exemplary embodiment of the disclosed technology.

Turning now to FIG. 4, an alternative embodiment of a qubit 50 is illustrated. In this embodiment, the qubit includes a pair of negative index lenses 54, which are disposed between or otherwise separate pairs of atoms 52 e.g., neutral atoms. As is discussed with respect to FIG. 3, the qubit 50 may include or otherwise make use of a variety of atoms, such as neutral atoms or neutral alkaline atoms, e.g., neutral cesium atoms. In addition, as is discussed above, if a given negative index lens has a thickness of d, in the case of a "perfect lens" the atoms on opposite sides of the negative index lens 54 may be spaced apart by a distance of 2d.

Figure 5:
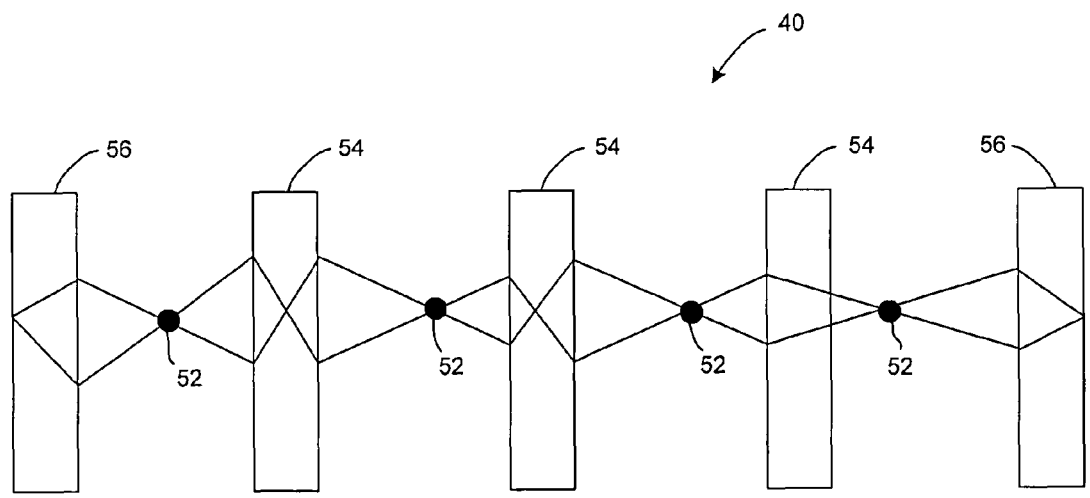
FIG. 5 is a diagrammatic illustration of a qubit array in accordance with an exemplary embodiment of the disclosed technology.

Regardless of the particular qubit configuration being employed, multiple qubits may be arranged in or otherwise used to construct qubit arrays, where the qubits may be entangled, initialized or modified, and addressed. FIG. 5 illustrates an exemplary qubit array 40 arranged in accordance with the principles of the disclosed technology. The exemplary qubit array 40 includes a plurality of negative index lenses 54, where each negative index lens separates a pair of atoms 52, e.g., neutral atoms. In the illustrated embodiment, the qubit array also includes a pair of negative mirrors 56, e.g., mirrors constructed of a negative index material, thereby providing "perfect mirrors," at the ends of the array. The provision of negative index mirrors 56 at the ends of the array 40 provide for an optical path length of zero between the respective end atoms 52 and the respective negative index mirrors 56. As is discussed below, the qubit array is believed effective in providing entangled qubits in conjunction with the capability of modifying and reading individual qubits.

Figure 6:
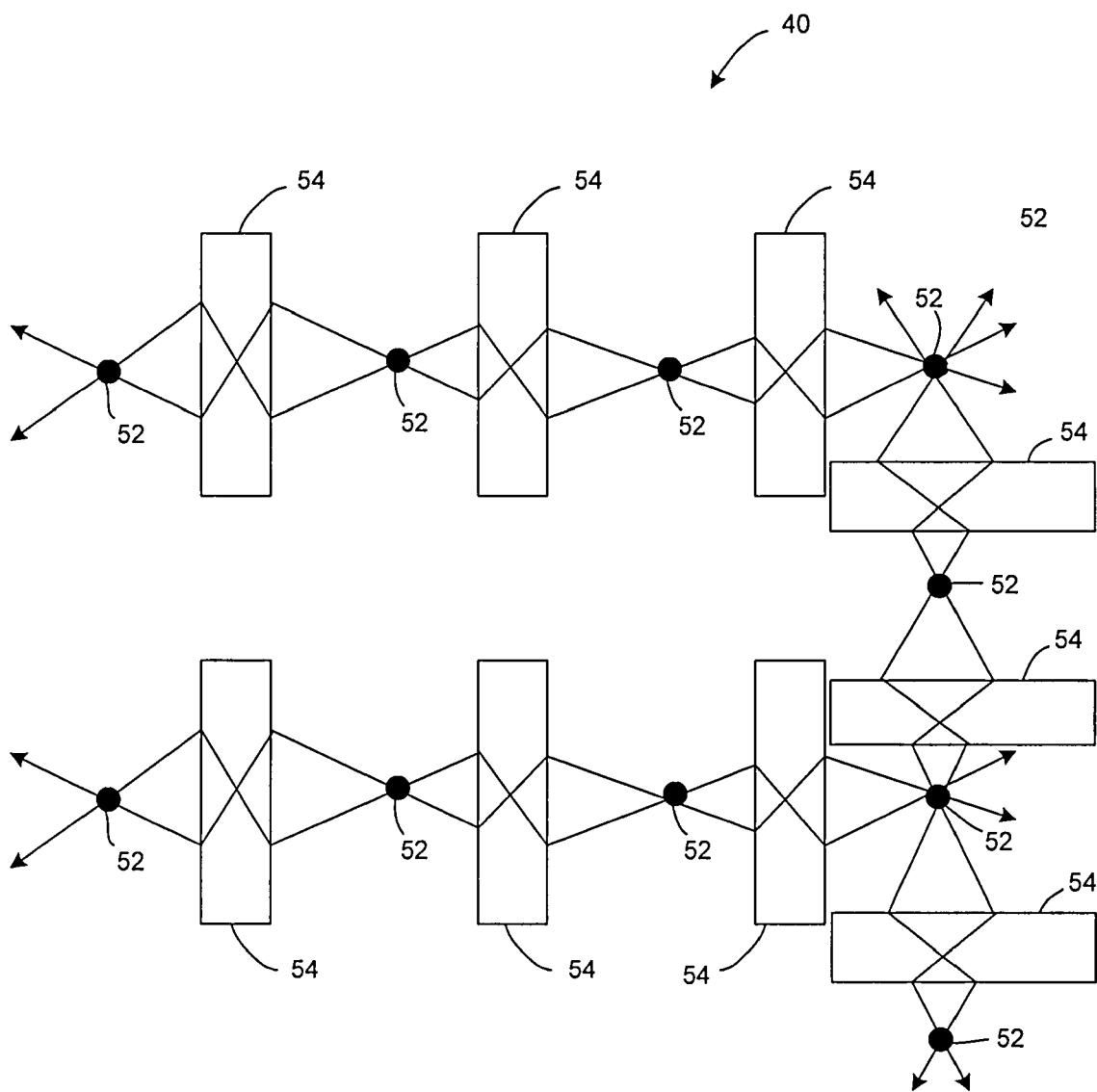
FIG. 6 is a diagrammatic illustration of a qubit array in accordance with an exemplary embodiment of the disclosed technology.

The qubits and qubit arrays discussed herein may be arranged in a variety of useful and scalable architectures. For example, the qubit array may take on the form of a one-dimensional qubit array (illustrated, for example, in FIG. 5). Alternatively, as is illustrated in FIG. 6, the qubit array 40 may be extended into two dimensions. Further, the qubit array is believed to be extendable into three dimensions, where the three-dimensional qubit array would be structured in a manner similar to that with respect to FIG. 6 only including a third dimension, for example a dimension having atoms and negative index lenses extending into or out of the plane on the page on which FIG. 6 is illustrated. While setting and reading of the atoms and lenses may be complex in a three-dimensional qubit array, it is believed that these complexities may be overcome by design considerations if a three-dimensional array is required, e.g., by the provision of a suitable array of optical fibers or cables or free special lasers used in conjunction with an array of mirrors to direct energy to desired locations. Of course other configurations operable to selectively and controllably direct energy, e.g., electromagnetic energy, to a variety of locations may be employed.

Figure 7:
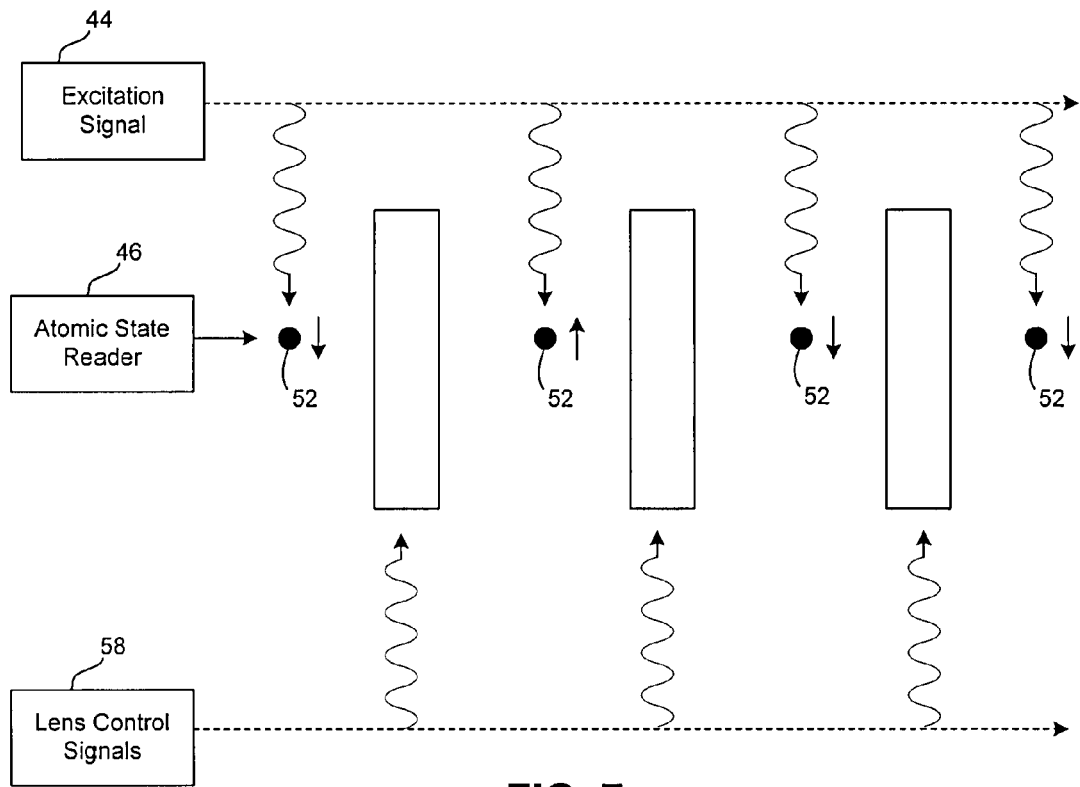
FIG. 7 is a diagrammatic illustration showing operation of an exemplary qubit array.
Figure 8:
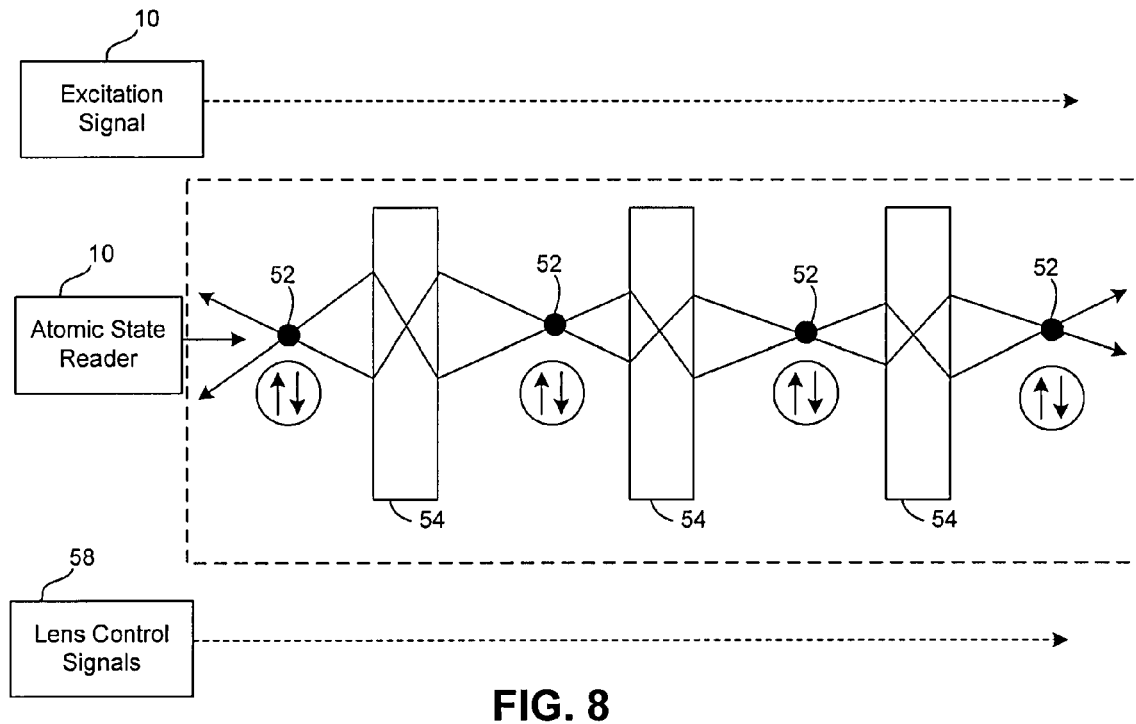
FIG. 8 is a diagrammatic illustration showing operation of an exemplary qubit array.

Turning now to FIG. 7 and FIG. 8, an exemplary qubit array is illustrated schematically showing various aspects of exemplary control circuitry, excitation sources 44, atomic state readers 46 and lens control circuitry 58. In the illustrated schematic embodiment, excitation signals, e.g., signals used to controllably modify individual qubits, may be generated by suitable excitation sources, for example, a source providing 9.2 GigaHertz (GHz) signals used to excite, for example, cesium atoms. The excitation signals may be provided to modify the atoms as required by a given programming algorithm using 9.2 GHz signals. In addition, lens control signals may be generated by an appropriate excitation source, e.g., a suitable laser source or sources together with optical fibers or arrays of mirrors to controllably direct the energy to selected negative index lenses, or a source of electric or magnetic field sources. One advantageous property of the herein-discussed negative index mirrors is that the negative index mirror may be switched between negative index material properties and positive index material properties upon the application of appropriate electromagnetic excitation or electromagnetic control. The device illustrated in FIG. 7 also includes an atomic state reader 46, which may be used to read the qubits and atoms within the qubits, for example, by determining the state, e.g., a spin-up state or a spin-down state or some superposition of the spin-up state and spin-down state. While the excitation source 44 and atomic state reader 46 are schematically illustrated as separate units, it is to be appreciated that the related functionality may be embodied in a single unit capable of controllable modifying and reading the individual qubits.

FIG. 7 schematically illustrates initializing or programming the qubits using the excitation source. In addition, FIG. 7 illustrates energizing or otherwise activating one or more of the negative index lenses 54 to bring about a "negative index off" state, thereby transitioning the lenses 54 to a positive index material state.

FIG. 8 illustrates the qubit array of FIG. 7 when the negative index lenses are returned to their negative index material state. By activating the negative index lenses and then deactivating the negative index lenses, the states of the atoms within the qubit array may be entangled. FIG. 8 illustrates the qubit array where the negative off mechanism has been removed along with removal of 9.2 GHz modification signals. The system can then be viewed as being isolated. At this stage, the atoms may be interrogated to determine their states. Stated differently, a quantum computing device employing the above-described qubits and qubit arrays may be operated by initializing the atoms in a set of states, selectively activating and/or deactivating the negative index lenses to initiate a type of quantum evolutionary calculation and interrogating the atoms again after a certain amount of time to obtain a result.

Figure 9:
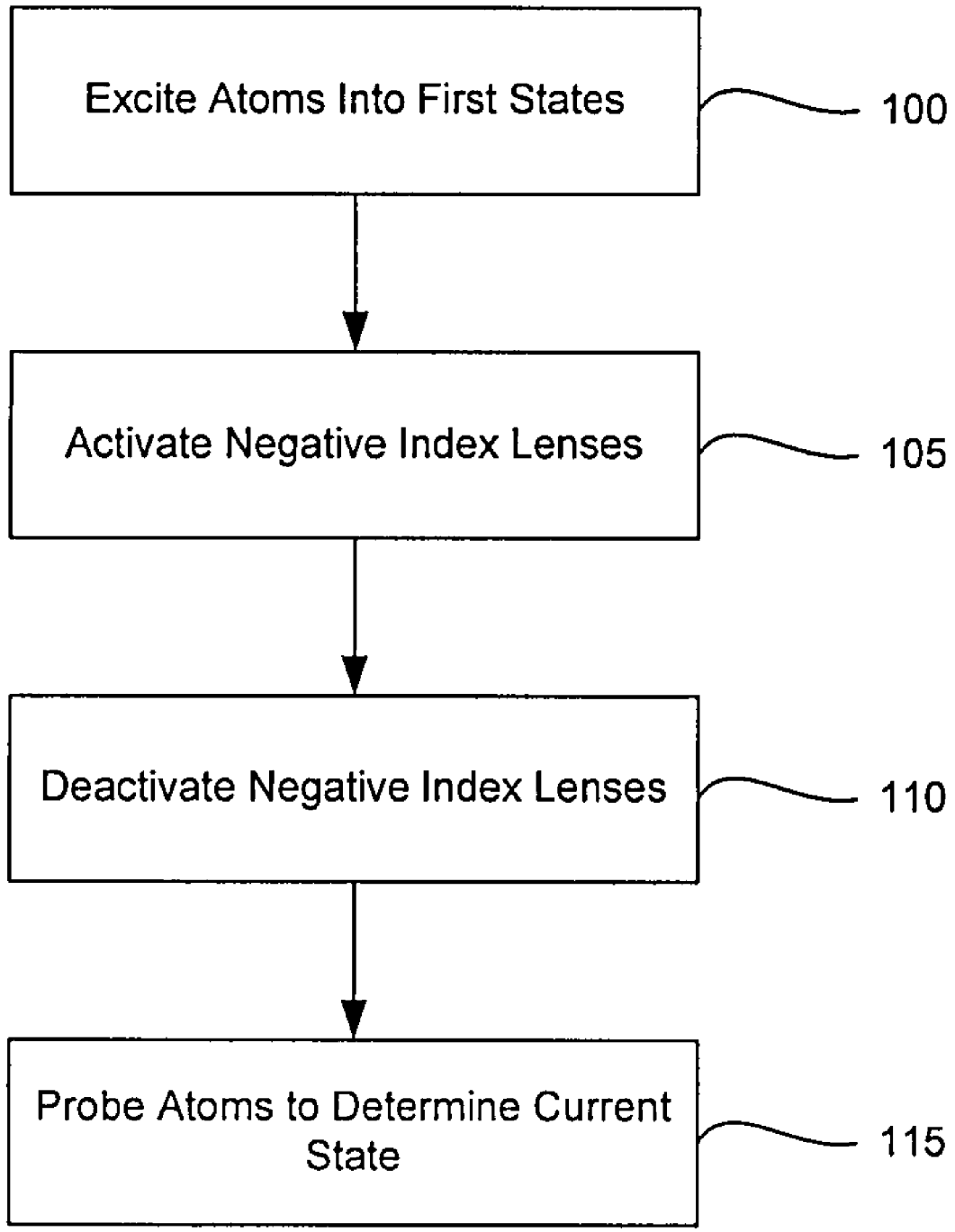
FIG. 9 is a flow chart or functional diagram representing a quantum computing method in accordance with one aspect of the disclosed technology.

While for purposes of simplicity of explanation, the flow charts or functional diagram in FIG. 9 include a series of steps or functional blocks that represent one or more aspects of the quantum computing device employing the herein described qubits and/or qubit arrays, it is to be understood and appreciated that aspects of the invention described herein are not limited to the order of steps or functional blocks, as some steps or functional blocks may, in accordance with aspects of the present invention occur in different orders and/or concurrently with other steps or functional blocks from that shown or described herein. Moreover, not all illustrated steps or functional blocks representing aspects of relevant operation may be required to implement a methodology in accordance with an aspect of the invention. Furthermore, additional steps or functional blocks representative of aspects of relevant operation may be added without departing from the scope of the present invention.

Turning now to FIG. 9, an exemplary quantum computation methodology is illustrated in terms of functional blocks. At functional block 100, some atoms within the qubit array are excited using a suitable excitation source, for example, in the case of cesium atoms, a source capable of generating 9.2 GHz signals. As is discussed above, the individual qubits within the qubit array may be modified as required by a suitable programming algorithm.

At functional block 105, the negative index lenses are activated or otherwise energized, for example, using a suitable lens control source, such as an array of lasers and mirrors positioned to controllably and selectively activate or de-activate the negative index lenses and mirrors.

At functional block 110, the negative index lenses are deactivated or otherwise returned to their negative index material properties thereby entangling the states of the qubits within the qubit array. At functional block 115, the qubits or atoms within the qubit array may be probed or otherwise interrogated to determine their current state, e.g., a spin-up state, a spin-down state, or some superposition of a spin-up state and a spin-down state.

Stated more simply, operation of the qubit array disclosed herein includes placing the atoms within the qubit array within a set of states, e.g., in accordance with a predetermined programming algorithm, using selective activation of the negative index lenses to initiate a type of quantum evolutionary calculation, and probing or interrogating atoms within the qubit array after a certain amount of time to obtain a result.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A quantum computing system comprising:
    a plurality of qubits, each qubit comprising a pair of atoms; and a negative index lens disposed between the pair of atoms;
    control circuitry operatively connected to the negative index lenses, the control circuitry being operable to switch the negative index lenses between a negative index state and a positive index state; and
    atomic state reading circuitry configured to determine atomic spin states of the atoms.

2. The quantum computing system of claim 1, wherein the negative index lens is arranged to entangle states of the pair of atoms.

3. The quantum computing system of claim 1, wherein the negative index lens is arranged to electromagnetically link the pair of atoms.

4. The quantum computing system of claim 1, wherein the negative index lens is arranged between the pair of atoms such that the optical path length between the pair of atoms is zero.

5. The quantum computing system of claim 1, wherein the pair of atoms is comprised of Cesium atoms.

6. The quantum computing system of claim 1, wherein the pair of atoms is comprised of neutral atoms.

7. The quantum computing system of claim 1, wherein the pair of atoms is comprised of alkaline atoms.

8. The quantum computing system of claim 1, wherein the negative index lens is comprised of a material having an index of refraction of $n=-1$.

9. The quantum computing system of claim 1, wherein the negative index lens is comprised of a metamaterial.

10. The quantum computing system of claim 1, wherein each qubit further comprises:
    a first negative index mirror disposed adjacent to a first atom of the pair of atoms; and
    a second negative index mirror disposed adjacent to a second atom of the pair of atoms.

11. The quantum computing system of claim 10, wherein the first and second negative index mirrors are comprised of materials having an index of refraction of $n=-1$.

12. The quantum computing system of claim 1, wherein the negative index lens facilitates entanglement of states of the atoms.

13. The quantum computing system of claim 1, wherein each qubit further comprises:
    a second negative index lens disposed adjacent to one of the pair of atoms; and
    a third atom disposed adjacent to the second negative index lens.

14. The quantum computing system of claim 1, wherein the plurality of qubits are arranged in a two-dimensional architecture.

15. The quantum computing system of claim 1, wherein the plurality of qubits are arranged in a three-dimensional architecture.

16. The quantum computing system of claim 1, further comprising:
    an excitation source configured to excite the atoms.

17. The quantum computing system of claim 16, wherein the excitation source is configured to provide 9.2 GHz signals to excite cesium atoms.

18. A quantum computing device comprising:
    a plurality of neutral atoms, each pair of neutral atoms being separated by a negative index lens, wherein each pair of neutral atoms and negative index lens are arranged to define a quantum bit; and
    control circuitry operatively coupled to one or more excitation sources, wherein the control circuitry and one or more excitation sources cooperate to entangle the quantum bits.

19. The quantum computing device of claim 18, wherein the quantum bits are arranged in a two-dimensional architecture.

20. The quantum computing device of claim 18 wherein the quantum bits are arranged in a three-dimensional architecture.

* * * * *